Dec. 30, 1941.  G. B. LANGER  2,268,075
TAKE-OUT FOR GLASSWARE FORMING MACHINES
Filed Sept. 24, 1938  10 Sheets-Sheet 2

INVENTOR.
George B. Langer,
ATTORNEYS.

Inventor
George B. Langer,

Dec. 30, 1941.  G. B. LANGER  2,268,075
TAKE-OUT FOR GLASSWARE FORMING MACHINES
Filed Sept. 24, 1938  10 Sheets-Sheet 5

Inventor
George B. Langer
Attorneys

Fig.12.

Patented Dec. 30, 1941

2,268,075

UNITED STATES PATENT OFFICE 2,268,075

TAKE-OUT FOR GLASSWARE FORMING MACHINES

George B. Langer, Anderson, Ind., assignor to Lynch Corporation, Anderson, Ind., a corporation of Indiana Application September 24, 1938, Serial No. 231,605

26 Claims. (Cl. 49—14)

The present invention relates to glassware forming machines such as machines for making glass articles and to takeout mechanism therefor, and aims generally to improve the construction and operation of the machine as well as the takeout mechanism.

Heretofore, in glassware forming machines provided with automatic takeout mechanism, the top portion or finish of the glass article projects above the top of the mold in which the article has been previously formed. The mold is then opened sufficiently at the takeout position so that the article may be moved out between the open front joints of the mold. The takeout jaws are positioned over the finish in open or down position. After the mold has been opened, the takeout jaws usually close around the finish or bead projecting above the top of the mold and then lift the article slightly to clear the bottom plate of the mold. Suitable means are then provided for moving the grasping unit and article laterally away from the mold and over a conveyor. The grasping jaws are then slightly lowered and opened to deposit the article on the conveyor.

In the manufacture of certain large glass articles, for example, square glass blocks, the dimensions of which are sometimes 17 inches across corners, it is not always possible, due to mold construction and shape of the article, to allow any of the glass to project above the top of the mold. Also it is not practical, in the manufacture of such large ware, to open the molds sufficiently wide so that the ware may be moved outwardly through the open front joint, as to do so would seriously limit the number of molds capable of being used on a mold table of a given radius.

My invention aims to improve the construction of glassware making machines and particularly takeout mechanism therefor by providing a mechanism for the removal of large size ware, such as glass blocks, from molds which have only been slightly open, with the open front joint of the mold substantially less than the diameter or transverse dimension of the formed ware.

More specifically the invention provides an improved glassware machine and takeout mechanism, the latter having a grasping head movable above and in registry with the mold as the mold moves in at the takeout position. The mold is then slightly opened, and the jaws of the grasping head are lowered, in open position, between the glass article and the inner face of the mold. Subsequently the jaws are closed and the grasping head elevated to a point where the bottom of the ware clears the top of the slightly opened mold. The grasping unit with the glass article is then moved outwardly to a point over a conveyor where the jaws are opened to deposit the article.

According to one form of my invention, the glass articles are deposited upon a pivoted dump plate, the weight of the articles moving the plate to an inclined position so that the article may slide down the plate and clear the underside of the jaws and move onto the conveyor.

According to a modified form of the invention, opening of the jaws deposits the ware directly upon the conveyor and a secondary cylinder is exhausted which permits the opened jaws to rise above the top of the ware, which then moves out from under the jaws by movement of the conveyor.

Other aims and advantages of the invention reside in the improvement of the timing mechanism of a glassware forming machine, preventing operation thereof unless certain movable parts, as for example, the takeout mechanism, is clear of other movable parts of the machine, as for example, the movable molds.

Other aims and advantages of the invention will be apparent to those skilled in the art in view of the more detailed description of certain preferred embodiments of the invention as illustrated in the accompanying drawings, in which—

The invention advantageously may be embodied in a glassware forming machine of the rotary type, although it is not restricted to use with this type of machine in all particulars.

The machine selected for illustration herein may be a rotary machine of the "press" type and specifically one which is adapted for the pressing of square dished articles, as for example, pressed glass blocks, although other ware is contemplated within the scope of the invention.

Figure 1:
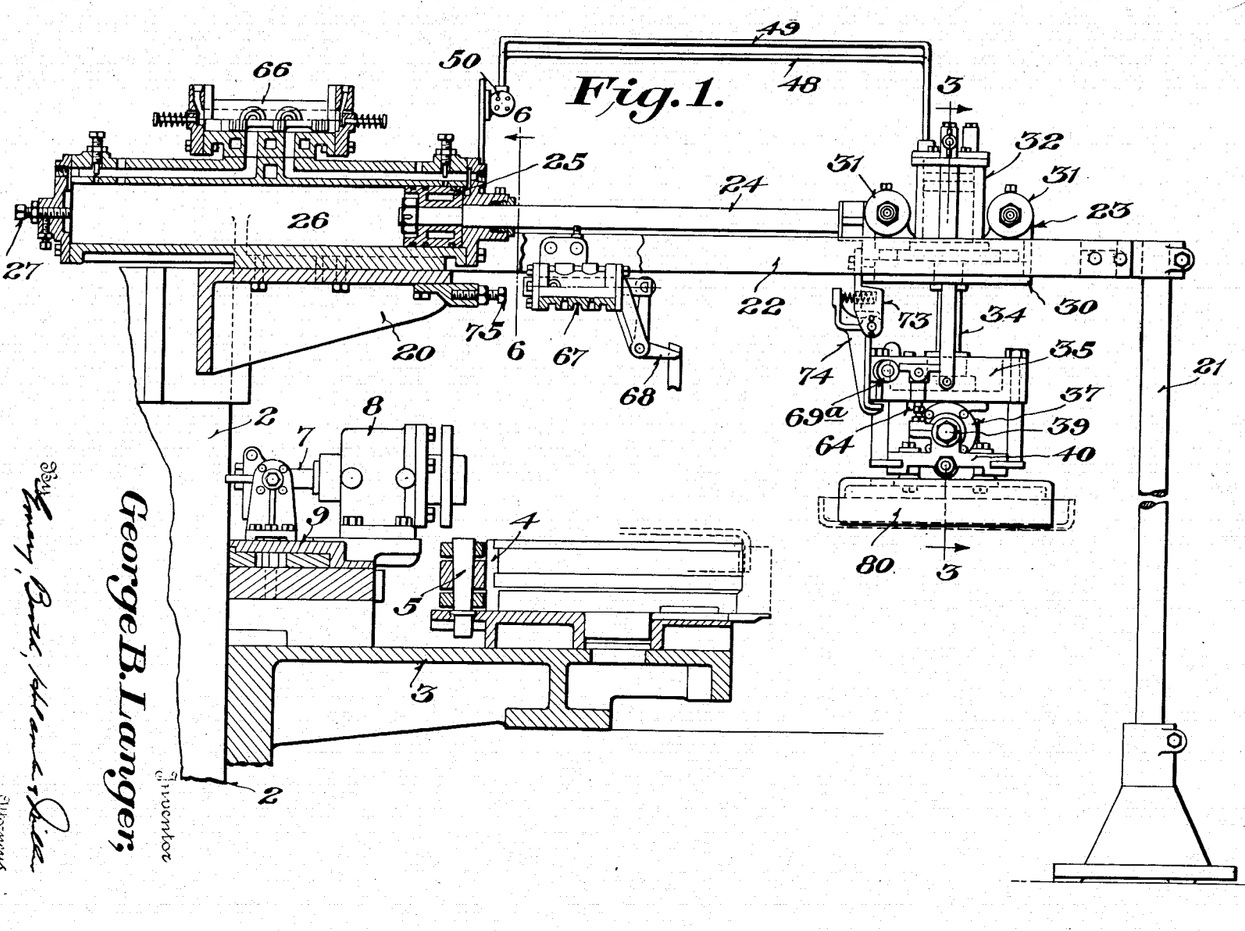
Fig. 1 is a side elevation of a fragmentary portion of the forming machine and takeout mechanism, certain of the parts being shown in section to illustrate better the construction preferred.

Such a machine conveniently may embody a suitable base, center column 2 on which is rotatably mounted a mold carrier 3 carrying a plurality of molds 4, which may be hingedly mounted upon hinge pins 5 (Figs. 1 and 11) arranged to be moved successively to a pressing position under a pressing plunger not shown, and later to a takeout position. The molds may be automatically opened by means of a piston 7 (Figs. 1 and 11), working in an air cylinder 8 supported on a cam housing bracket 9 carried on the column 2.

The mold carrier 3 may be intermittently moved by any suitable means to present the molds 4 in succession to a pressing position, under the pressing plunger, and later to a takeout position where the molds may be opened and the ware is automatically removed therefrom by a takeout mechanism. As is well understood in the art, such mechanism may comprise a reciprocable fluid pressure operated piston working in a cylinder and having a piston rod 10 (see Fig. 11), connected to an oscillating arm 11 carrying a pin 12 engaging a socket 13 in the mold carrier and adapted to be withdrawn therefrom by means of a pull-down cylinder piston 14. Such table turning mechanism for example, as shown in the patent to Edward Miller, No. 2,062,522, dated December 1, 1936, may be regarded as conventional and therefore is not illustrated in detail here. With such mold moving mechanism, the pin 12 on the oscillating arm engages its socket 13, preparatory to the indexing stroke of the piston in its cylinder, so that the mold carrier is indexed one step during the outward movement of the piston. At the end of the outward movement of the piston, the pin 12 is withdrawn from its socket 13 upon actuation of the pull-down cylinder piston 14, so that the main piston may be moved on its idle stroke.

The takeout mechanism may include a support 20 clamped to the column 2 and a standard 21 (Fig. 1) bridged by a track 22 along which travels a wheeled carriage 23 carrying the ware-gripping and hoisting mechanisms, and connected to the outer end of a piston rod 24, the piston 25 of which is reciprocable within a horizontally disposed cylinder 26 which may be supported on the bracket 20. When the piston 25 is in its fully retracted position in the cylinder 26 (at the left, as viewed in Fig. 1), the axis of the carriage 23 is directly in alignment with the axis of the mold 4, and to insure this alignment the inner end of the cylinder 26 may be provided with an adjustable limiting stop 27, for example, a threaded bolt, adapted to limit the inward travel of the piston 25 and therefore the carriage 23.

The carriage 23 advantageously is provided with ware-gripping mechanism, and means for first lowering the gripping mechanism, then actuating the gripping jaws to grip the ware, and then lift the ware and laterally shift the carriage and ware to a position over a conveyor or other support. At the completion of the lateral shifting movement above described, the gripping members open to release the ware and then are returned to their original positions axially over the next molds. Such movements are conveniently accomplished by novel mechanism carried by the carriage 23.

Figure 2:
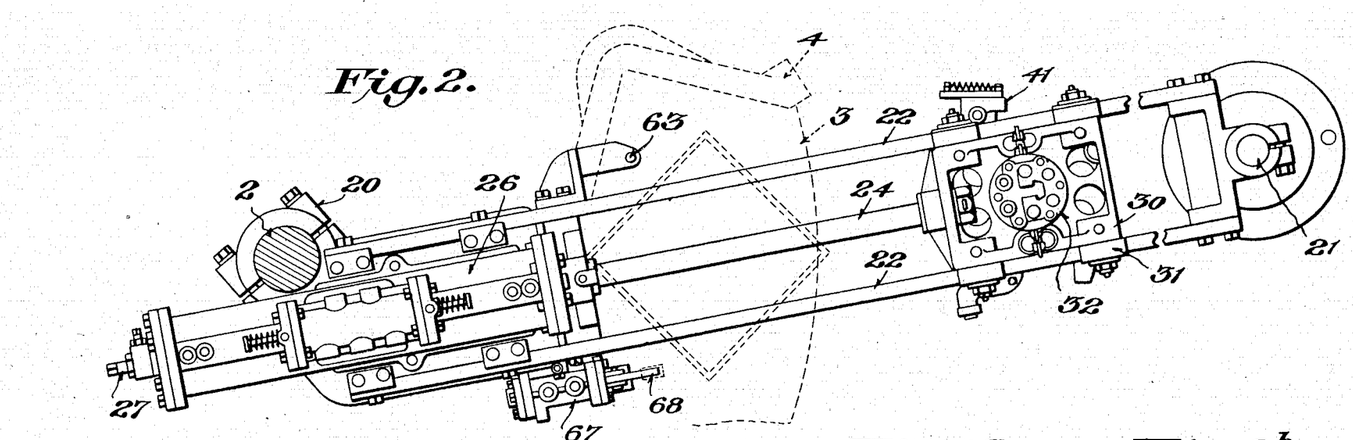
Fig. 2 is a plan view of a fragmentary portion of a glassware forming machine and takeout mechanism.

The carriage 23 preferably includes a frame 30 carrying a set of rollers 31 (see Figs. 1, 2 and 3) and a vertically disposed cylinder 32, in which is mounted a piston 33 having a depending piston rod 34 at the lower end of which is a frame 35 movable vertically with the piston 33. The frame 35 may carry a pair of guides 36 slidable through the frame 30 (see Fig. 3) to steady the former in its vertical reciprocative movements.

Connected to the movable frame 35 and immediately below it is a horizontally disposed double cylinder 37 in which is reciprocably mounted a pair of opposed pistons 38, the rods 39 of which extend outwardly beyond the cylinder ends and carry ware-gripping tong holders 40.

Figure 6:
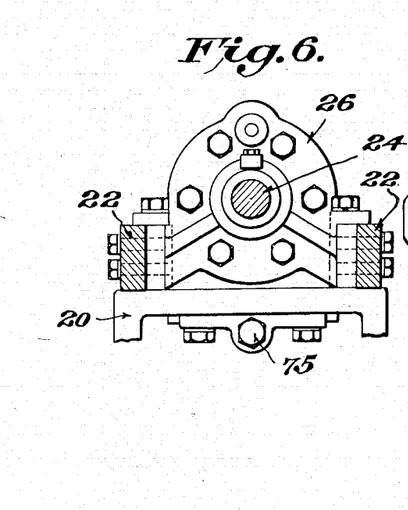
Fig. 6 is a sectional view taken on the line 6—6 of Fig. 1.
Figure 6A:
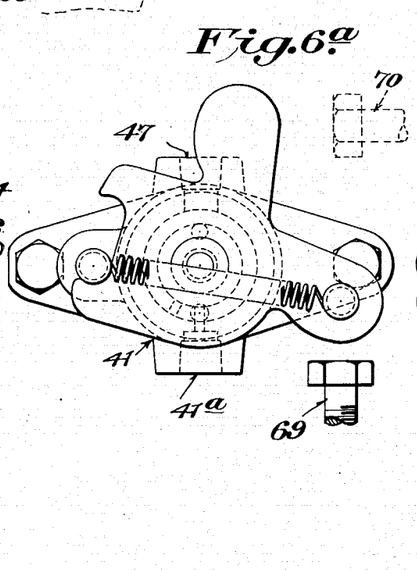
Figs. 6a and 6b are respectively, end and longitudinal sectional views of the grasping jaw control valve.
Figure 6B:
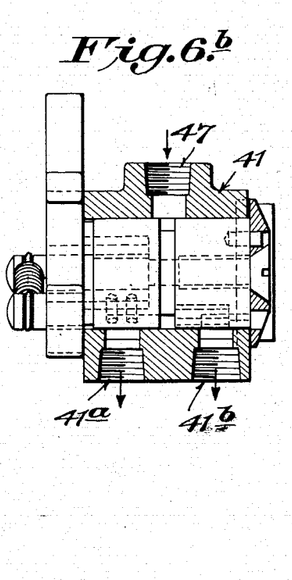
Figure 7:
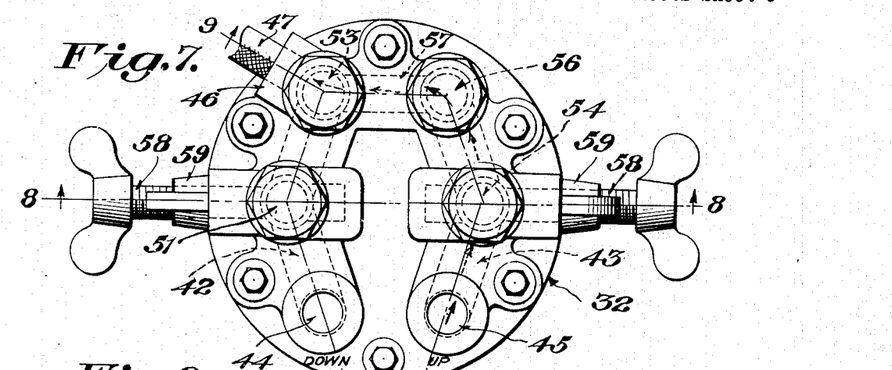
Fig. 7 is a plan view of the operating and control head for the lifting cylinder.
Figures 8, 9, 10:
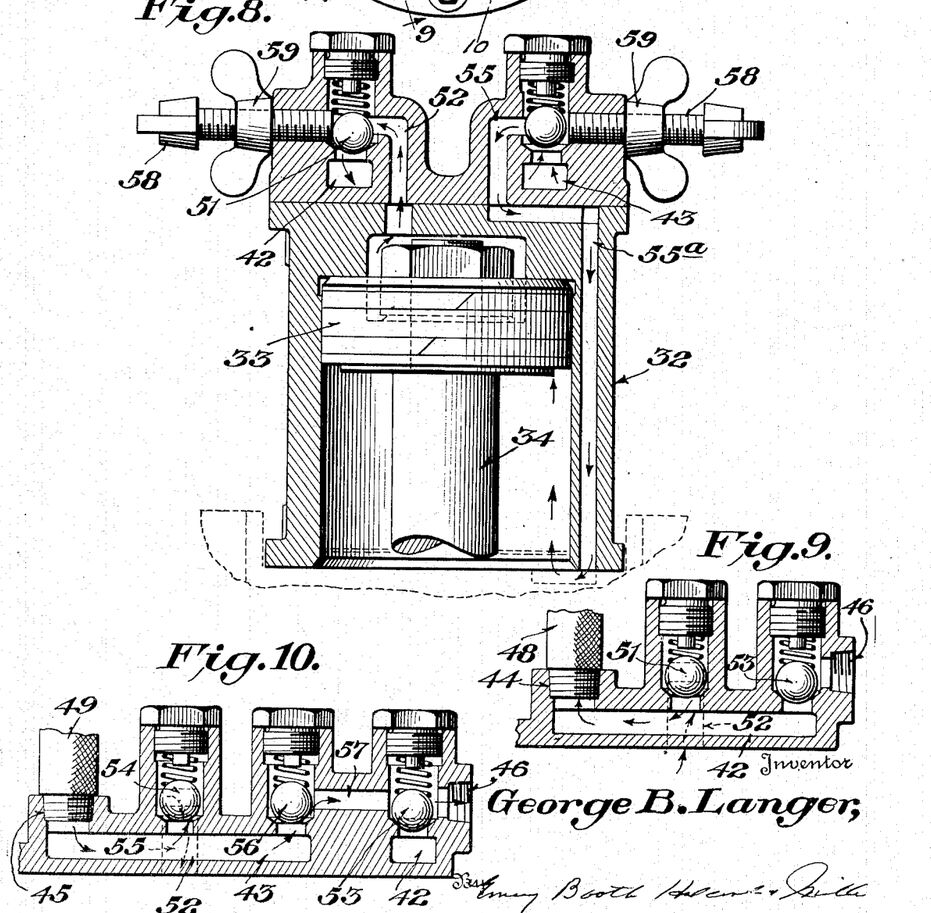
Fig. 8 is a sectional view taken on the line 8—8 of Fig. 7.
Fig. 9 is a sectional view taken on the line 9—9 of Fig. 7.
Fig. 10 is a sectional view taken on the line 9—10 of Fig. 7.

The upper end or head of the cylinder 32 is ported in a novel manner to admit air under pressure to and exhaust air from opposite ends of the cylinders to move the piston in opposite directions and at the same time maintain a constant supply of air pressure to a valve 41 (Figs. 6ª and 6ᵇ) for opening or closing the ware-gripping jaws.

The head of the cylinder 32 (see Figs. 3, 7, 8, 9 and 10) is preferably a casting providing separated channels 42 and 43 connected to separate spaced inlets 44—45 respectively, and leading to a common outlet 46 communicating through hose 47 with the valve 41 for controlling air under pressure to opposed ports of the ware-gripping jaw motor 37. The inlets 44—45 are connected to hose lines 48—49 (Fig. 11) controlled by a lifting cylinder operating valve 50, which may be of the spool type so as to alternately supply pressure air to and exhaust air from said inlets 44—45.

Above the channel 42 (Fig. 9) is a spring pressed ball check valve 51 communicating with a laterally spaced channel 52 leading to the upper end of the cylinder 32, and constituting the "down air" channel for the cylinder. A similar spring pressed ball check 53 is interposed between the end of the channel 42 and the outlet 47.

Above the channel 43 (Fig. 10) is a spring pressed ball check valve 54 communicating with a laterally spaced channel 55 communicating with a cored passage 55ª leading to the lower end of the cylinder 32 and constituting the "up air" channel for the cylinder. A similar ball check valve 56 is interposed between the end of the channel 43 and another passage 57 communicating with the outlet 47 above the ball check 53.

Thus when air under pressure is in line 48, line 49 is on exhaust. Air under pressure therefore, flows through inlet 44 to channel 42, raises ball check 51 and passes to channel 52 to force the piston 33 down. The air also raises ball check 53 and passes out through outlet 47 producing pressure air in line 47 leading to valve 41. As the piston 33 moves downwardly, the air below it must be exhausted, and this is permitted as the air in channel 55 displaces ball check 54 and exhausts through inlet 45 and hose 49.

Similarly, when the piston 33 is to be raised, air pressure is on in line 49 and line 48 is on exhaust. Air under pressure flows, therefore, through inlet 45 and channel 43, raising ball check valves 54 and 56. Lifting ball check 54 admits air under pressure to channel 55 leading to the bottom of cylinder 32 to raise the piston. Lifting ball check 56 admits air under pressure to channel 57 and thence allows air to pass over ball check 53 to hose 47. At the same time, air from channel 52 may exhaust through ball check 51, channel 42, outlet 44, the check valve 53 preventing the outlet 47 from being placed on exhaust.

The opposite strokes of the piston 33 may be cushioned by checking the rate of exhaust of air from a cylinder. This may be accomplished by applying a restraining pressure upon the raising of the ball checks 51, 54, as for example, by threaded screws 58 threaded into the head and locked in position by lock nuts 59.

Assuming that the mold carrier 3 has just been indexed, a mold 4 is stopped at the takeout position axially under the takeout gripping jaws. The mold is then opened by mold opening piston 7 working in cylinder 8 supplied with air from line A (Fig. 11) by any suitable control valve (not shown). A branch air line A' leads to a grasping unit lowering trip valve 60 which may be a simple poppet valve having its stem 61 in the path of a trip cam 62 on an end of the mold opening piston rod, so that as the mold opening piston completes its stroke, it engages and lifts the stem of valve 60, admitting air from line A' to A² leading to one end of the lifting unit controlling valve 50, and operates to shift said valve to apply air pressure to the down air line 48 operating to lower the piston 33 in cylinder 32 and lower the grasping unit into the open mold. During this operation the grasping jaws are, of course, open. The valve 60 preferably is not held open during the entire time the mold opening piston 7 is in, but only during the stroke of piston 7. The duration of opening of valve 60 may be controlled by a dwell or trip cam 62 to hold the stem of valve 60 open long enough to get the proper timing of air pressure to valve 50. Operation of the control valve 50 admits pressure air to line 48 to lower piston 33 and frame 35 carrying the grasping unit.

Figure 11:
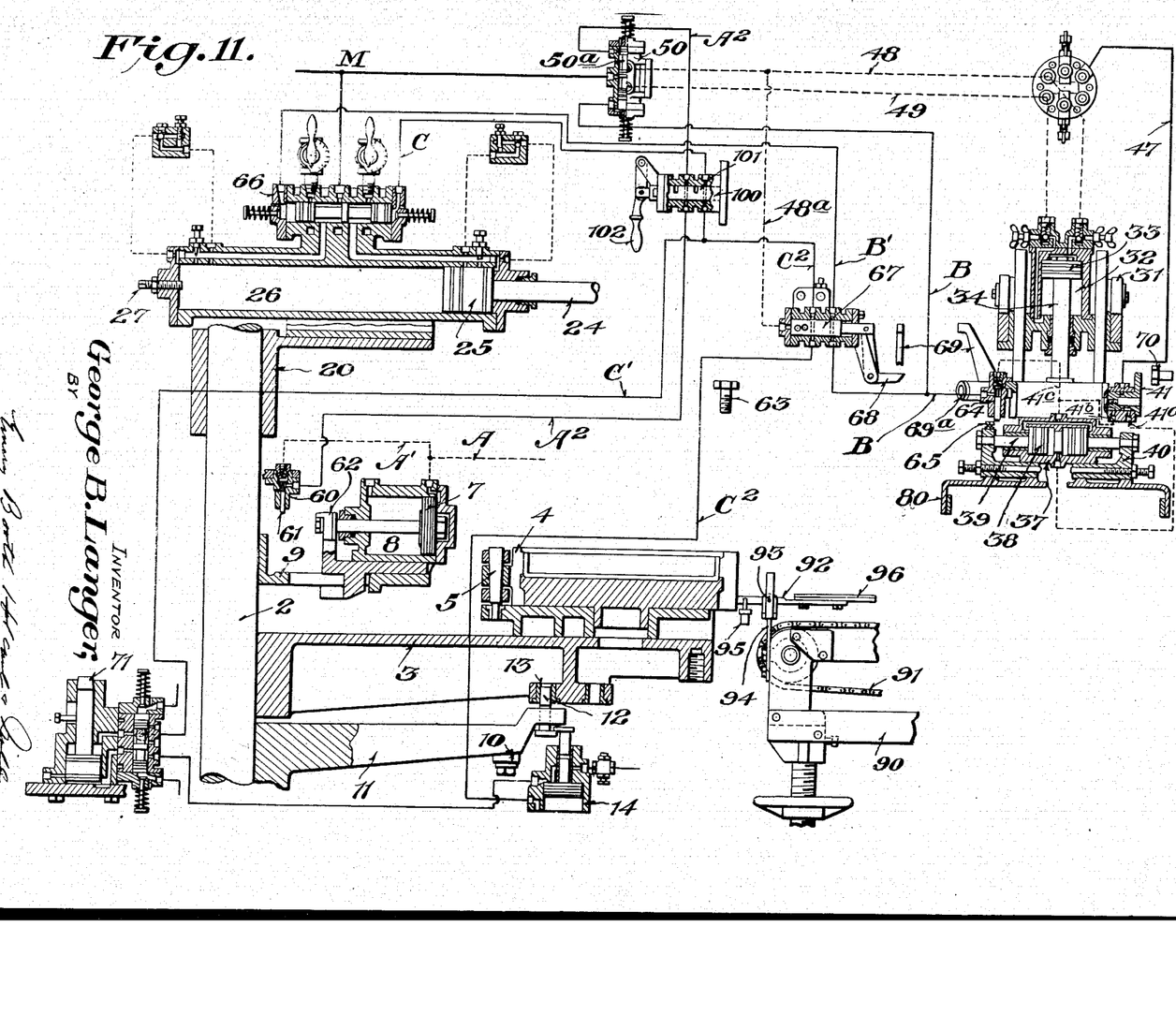
Fig. 11 is a diagrammatic view illustrating the timing of the machine.

On completion of the down stroke of grasping unit, the jaw operating rockable valve 41 strikes stop 63 (see Fig. 11). The casing of valve 41 is provided with three ports, one connected to the constant pressure air line 47 and the others 41ᵃ and 41ᵇ to the central portion and the opposed portions of the double cylinder 37, respectively. As the valve is engaged by the stop 63, air is shifted from line 41ᵃ to 41ᵇ to move the pistons 38 toward each other in the cylinder 37 to close the grasping jaws about the ware in the mold. The air line 41ᵇ also has a branch line 41ᶜ leading to a lift trip valve 64 which may be of poppet type, the stem of which is adapted to be engaged and lifted by an adjustable button 65 on a tong holder 40. Hence, as said jaws are operated to grasp the ware in the mold, the lift trip valve is opened to admit air into line B leading to the opposite end of the lifting cylinder control valve 50 to reverse the valve and apply air to the lifting line 49 leading through channels 43 and 52 to the lower end of cylinder 32 to raise the piston and with it, the entire grasping head and ware. The air pressure in line B remains constant as long as the jaws are closed, and serves to hold core 50ᵃ of valve 50, permitting air pressure to flow in line 49 until jaws open to release the ware.

A branch line B' also leads from the lift trip valve 64 to one end of a horizontal movement controlling valve 66 for controlling air to the cylinder 26, but this line B' is normally closed by a trip valve 67, as by air pressure from the down air line 48 and by safety finger 69 mounted on a movable frame 35. This safety finger 69 acts as a safety in the event that air in line 48ᵃ fails, as it engages rocker 68 connected to stem of valve 67 and normally holds valve 67 closed. When, however, the ware has been raised sufficiently to clear the top of the molds, finger 69 on the frame 35 is released from rocker 68, which is raised by a roller 69ᵃ, pushing rocker 68 up so as to open line B' and permit air to flow to the horizontal travel controlling valve 66, shifting the valve to the right as viewed in Fig. 11, and admitting air from main air line M to one end of the cylinder to move the piston horizontally therein. As the piston rod is connected to the carriage 23, such movement moves the grasping unit and supported ware laterally away from the mold to a point remote therefrom preferably over a conveyor.

At the end of the lateral travel just described, the jaw operating rocker valve 41 engages an adjustable stop 70 supported on a suitable part of the machine frame (see Fig. 11) and reverses rock valve 41, changing air from line 41ᵇ to 41ᵃ to open the grasping jaws and release the ware. The stops 63 and 70 not only serve to actuate the valve 41 to open and close the jaws, but by reason of their adjustability serve as a means to cushion the opening and closing movement of the jaws. Preferably they may be adjusted so that the valve is not fully opened to prevent the jaws from snapping closed, thus crushing or distorting the ware.

An air line C is connected to the opposite end of the horizontal travelling control valve 66 to reverse air to the cylinder 26 and return the carriage 23 and grasping unit to its normal position over the mold table. This line C may be supplied with air from auxiliary line C' which is supplied with air as the table lock pin 71 is withdrawn preparatory to the next indexing movement of the mold carrier, so that the return horizontal travel of the ware-gripping member takes place during the indexing of the next succeeding mold in the takeout station. A branch line C² from line C' leads through trip valve 67 and thence to the bottom of the drive pin pull-down cylinder 14 to release the drive pin 12 into engagement with one of the sockets 13. By this means the trip valve 67 acts as a safety against a premature turning of the mold carrier before the takeout is in proper position to clear the mold, as for example, before the takeout has lifted from its lowered position.

The trip valve 67 is held in closed position, that is, to shut off B' and C² by air connected with the down air line 48, supplied to one end of the valve 67 by means of line 48ª. Thus, whenever the grasping head is lowered, this valve closes line C² and prevents the release of the drive pin 12 into a table socket 13. Should air in line 47 fail for any reason, the crank lever 68 and trip finger 69 hold the stem of valve in a position to close this air line C².

Suitable means, as for example, a latch may be provided to hold the ware-gripping member in elevated position during the return horizontal travel to a position over the molds particularly in the event that air pressure in line 49 should fail during the instroke of the grasping unit. Such means may comprise a bracket 73 on the carriage 23 and a pivotally mounted spring tensioned latch 74 adapted to engage and support the frame 35 when in its elevated position. As the carriage is moved laterally to its position over the mold, the latch 74 strikes an adjustable stop 75 which releases the latch from the frame 35 to permit it to be later lowered into position to engage the ware in the mold.

Figure 3:
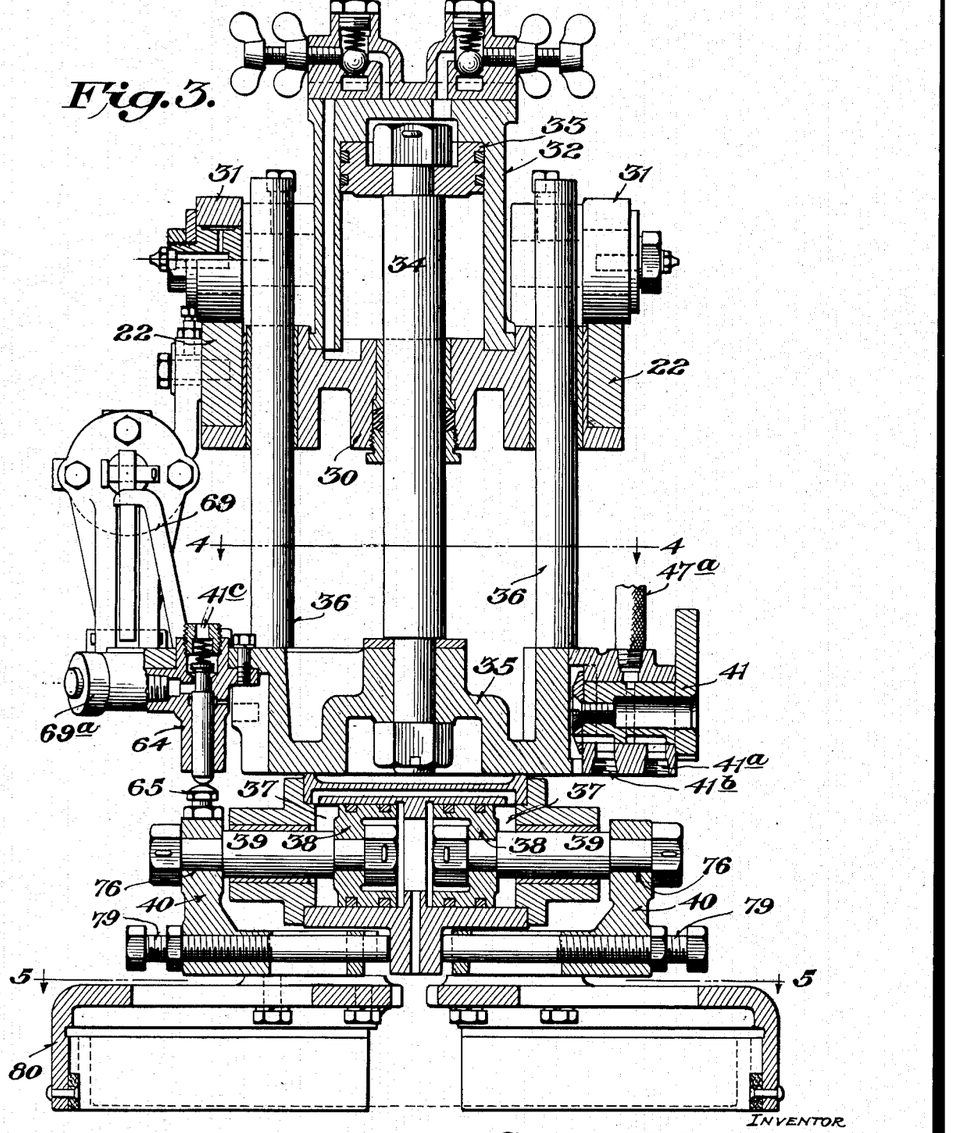
Fig. 3 is a sectional view taken on the line 3—3 of Fig. 1.
Figure 4:
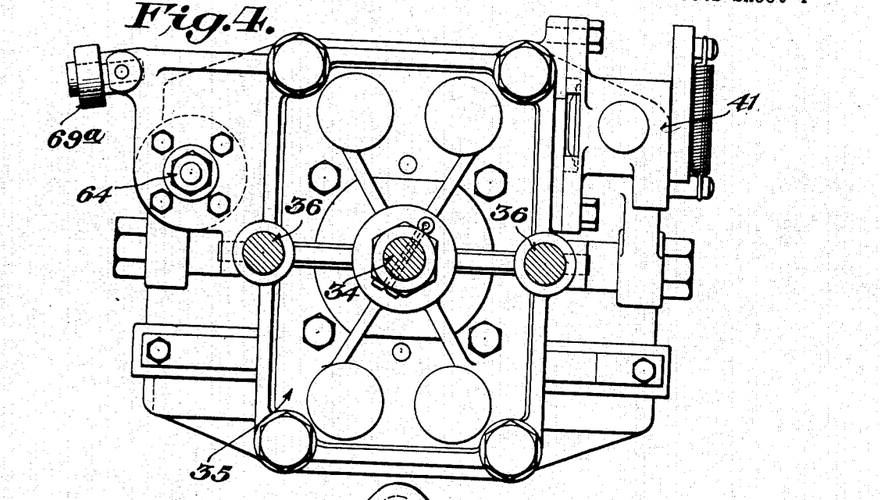
Fig. 4 is a horizontal sectional view taken on the line 4—4 of Fig. 3.

The ware-gripping tong holders 40 may be of any suitable construction, but conveniently include an apertured arm 76 capable of being secured to the piston rods 39 (Fig. 3). Preferably they may comprise substantially rectangular frames 77 (Fig. 5), having a central aperture 78ª adapted to receive adjusting screws 79 by means of which, movement of the jaws toward each other may be limited, irrespective of the length of the bores in the double cylinder 37.

Each of the frames 77 is adapted to detachably receive a grasping jaw 80, herein illustrated as generally rectangular in outline, and the pair of jaws 80 are complementary so that, when moved to closed position, they may engage and grasp a rectangular object, as for example, a rectangular building block section.

Any suitable means may be provided for detachably connecting the grasping jaws 80 to the holder frames 77 and preferably such means should be such as to provide for quick and ready replacement of different sized grasping jaws to accommodate blocks of various sizes and shapes. As herein illustrated, the jaws may be provided with upwardly extending stems 81 having shouldered heads 82 and adapted to be inserted through openings 83 in the frames 77. The stems may be locked to the holder frames, as by slotted keys 84 engaging under the shouldered heads 82 and provided with spring clips 85 engaging over the heads 82 to prevent accidental displacement of the keys 84. The keys 84 may be quickly removed from engagement with the shouldered heads 82 of stems 81, permitting the jaws to be removed and replaced by jaws of proper size.

The takeoff conveyor (Fig. 11) may advantageously include a supporting framework 90 and a movable endless belt or surface 91 as is well understood in the art. With the form of invention shown in Figs. 1–11, there is preferably employed a dump plate 92 to receive the ware released from the takeout jaws. This dump plate 92 may be pivoted as at 93 to a standard 94, counterweighted as at 95, so that the ware-receiving surface 96 normally is horizontally disposed. The counterweight is sufficient to normally maintain the surface 96 of the dump plate elevated above the movable surface 91, but insufficient to support the weight of the ware, which causes the plate 96 to be depressed, permitting the ware to slide down the surface 96 and be carried away by the movable surface 91.

In the operation of the takeout mechanism, according to the form of invention shown in Figs. 1–11, the ware-gripping jaws are open axially above the mold as the mold is opened at the takeout position. Opening of the mold, as above described, actuates valve 50 to admit air to upper end of cylinder 32, lowers piston 33 and ware-gripping jaws 80, so that the latter are positioned around the ware. On the completion of the downward movement of the piston, valve 41 strikes adjustable stop 63, rocking the valve to actuate the jaw closing pistons so that the jaws will grip the ware. As the jaws 80 grip the ware, button 65 lifts valve 64 admitting air to line B to reset valve 50 to cause raising of the piston 33 in cylinder 32, and with it the ware tongs 80 and ware. A branch air line B' leads through control valve 67 to admit air to valve 66 of horizontal travel cylinder 26 to cause outward travel of the grasping unit and ware, when the ware is elevated above the mold.

As the grasping unit reaches its outward position, where it is to deposit the ware, the arm of rocker valve 41 strikes adjustable stop 70, actuating valve to reverse pistons to release the ware, which is dropped on the pivoted dump plate from which it slides onto the conveyor. When the mold table is unlocked by the pin 71, preparatory to the next indexing movement, air is by-passed through line C' to line C to reset valve 66 and reverse piston 25 to move the open tongs to their normal position axially of the mold.

The machine is advantageously provided with a manually actuated control valve, such as at 100, interposed in the takeout air lines, as for example, lines A² and C, whereby the operator may optionally cut out operation of the takeout mechanism while permitting continued operation of the forming machine. Such valve may advantageously include a casing 100 having a longitudinally movable, valve stem 101 thereon, moved by manually controlled handles 102 pivoted to the stem. The valve casing 100 and stem 101 are provided with a number of series of ports adapted, in one position of the stem, to provide normal open communication between connecting lines, the number of communicating ports depending upon the number of air lines controlled. As herein illustrated, in Fig. 11, when the valve stem is in its outer position as shown, the communicating ports establish normal open communication through line A² and line C, pushing handle 102 and valve stem 101 in, shutting off the flow of air through these lines, preventing takeout from lowering or moving horizontally, while permitting continued operation of the table.

According to the modified form of invention, it is advantageous to effect an elevation of the ware-grasping jaws immediately following the depositing of the ware on the conveyor so that the ware may be moved away on the conveyor from under the takeout jaws. In the fabrication of most glassware, and particularly large sized ware, it is important to deliver the ware on the conveyor with a minimum of drop to avoid any tendency to mark or distort the ware. In the manufacture of certain glassware where the takeout grasping jaws embrace a substantial part of the ware, as for example, pressed glass blocks, it is advantageous to impart a supplemental lift to the ware-grasping jaws as they release the ware to avoid dropping the ware a distance equal to the height.

Figure 12:
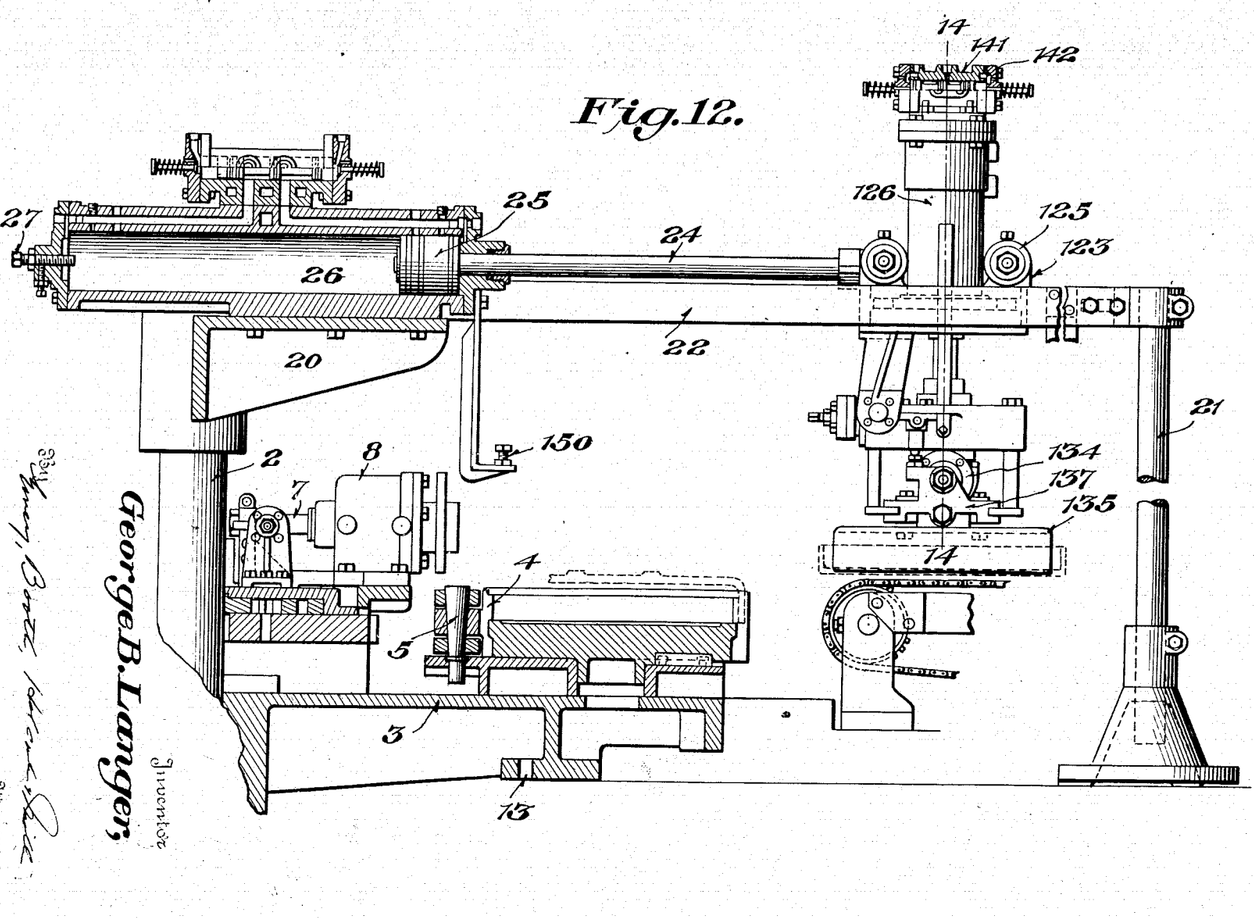
Fig. 12 is a view similar to Fig. 1, illustrating a modified form of the invention.
Figure 13:
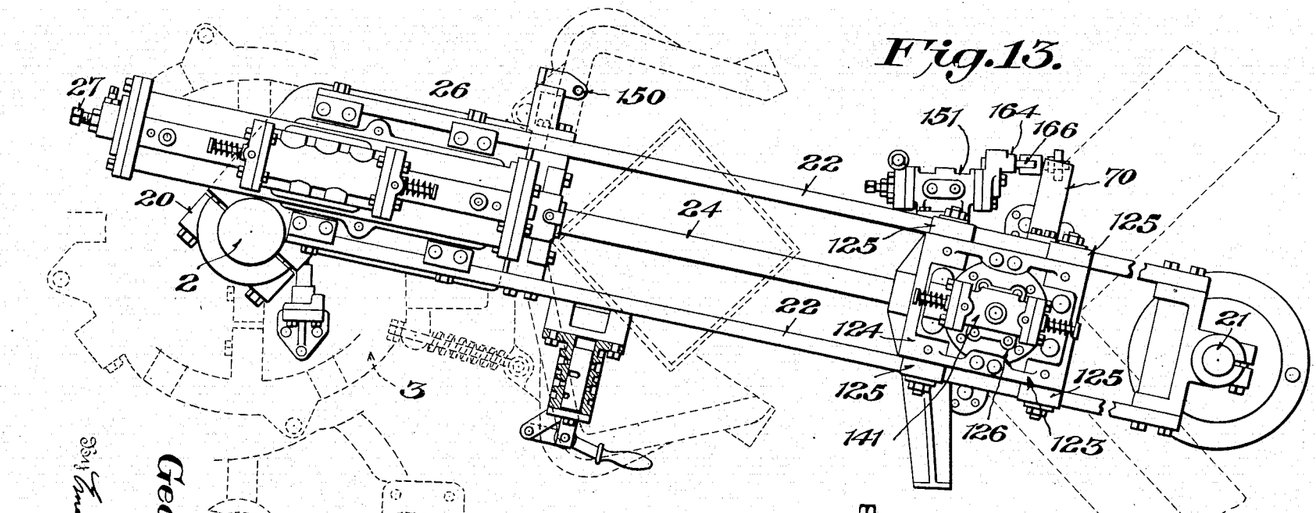
Fig. 13 is a plan view of the mechanism illustrated in Fig. 12.
Figures 16, 17:
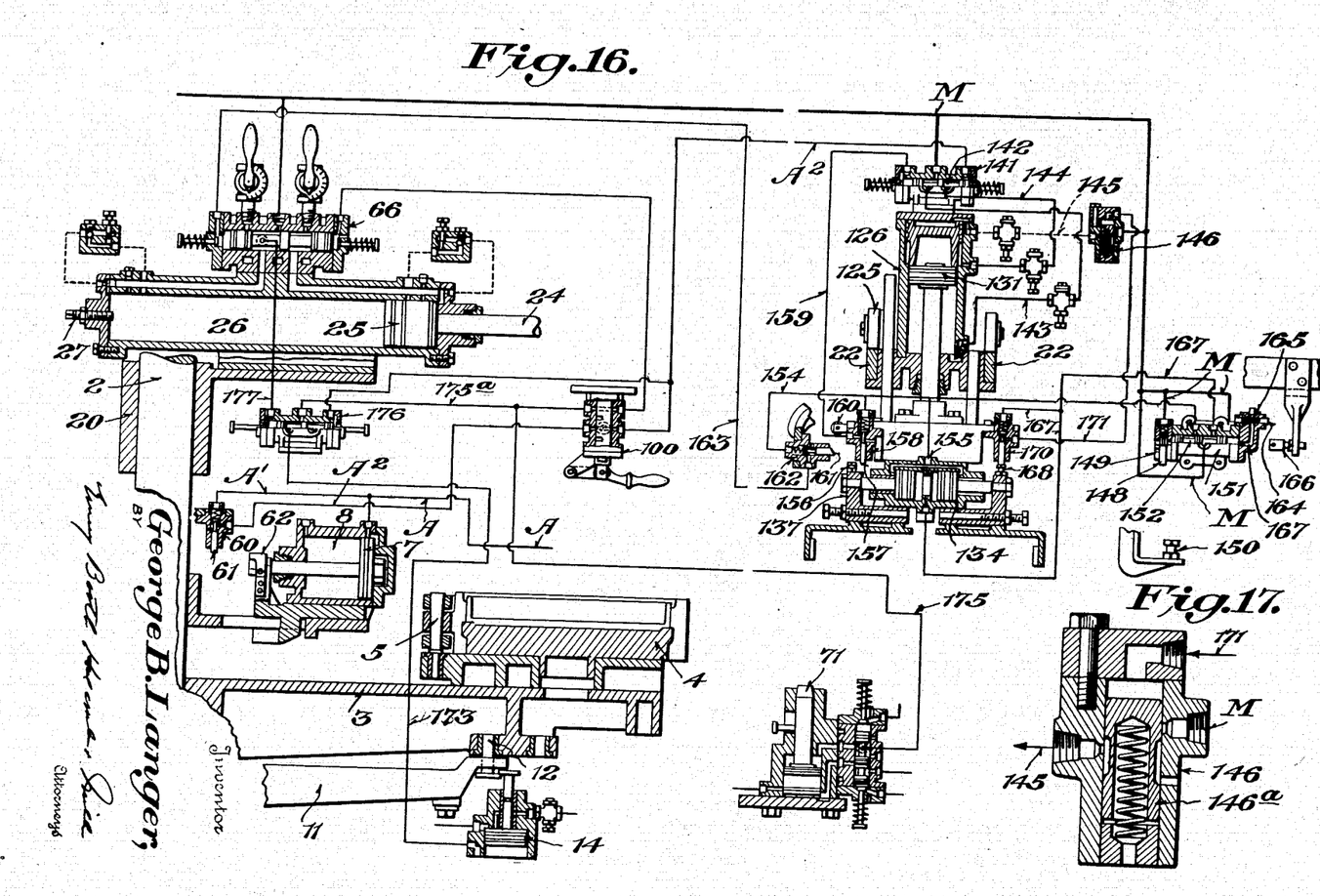
Fig. 16 is a diagrammatic view illustrating the timing of the mechanism according to the second form of the invention.
Fig. 17 is a detail sectional view of the valve 146.

The above advantages may be accomplished according to the form of invention shown in Figs. 12 and 16 wherein the carriage 123 advantageously is provided with primary and secondary lifting mechanisms, the latter serving to supplementally elevate the ware-gripping mechanism after the ware-gripping mechanism opens to release the ware. The primary lifting mechanism acts to lower the grasping jaws into engagement with the ware as well as to raise the ware from the bottom plate of the mold.

Figure 14:
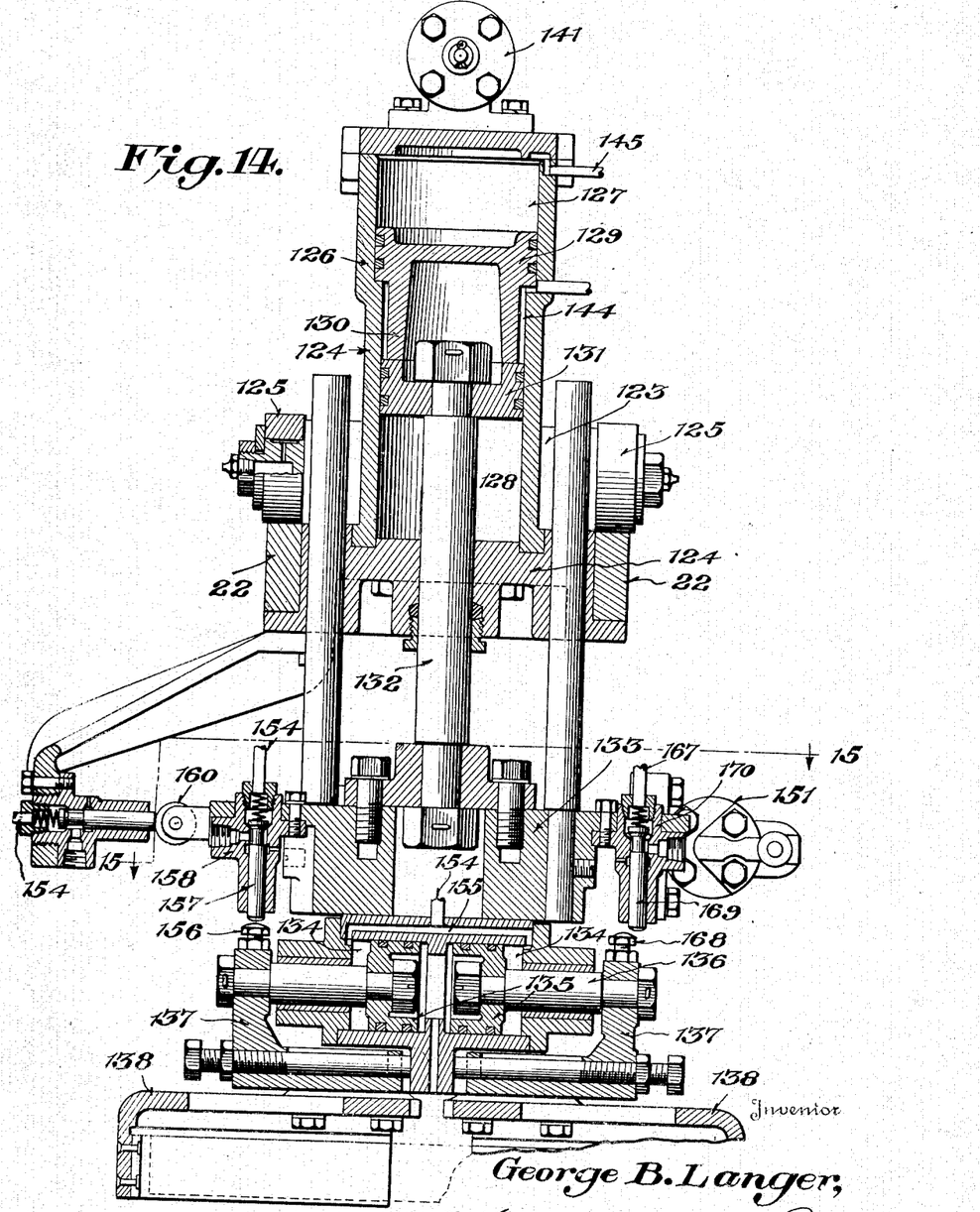
Fig. 14 is a sectional view taken on the line 14—14 of Fig. 12.
Figure 15:
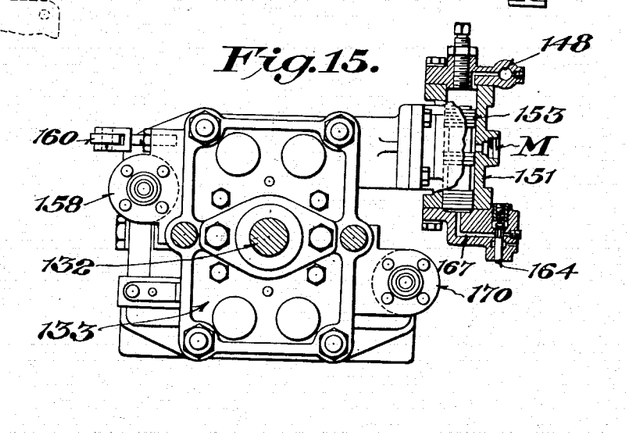
Fig. 15 is a horizontal sectional view taken on the line 15—15 of Fig. 14.

The carriage 123 preferably includes a frame 124 carrying a set of rollers 125 (Figs. 12, 13, 14 and 16) and a vertically disposed cylinder 126. The cylinder 126 has an enlarged bore at the upper end constituting a secondary lift cylinder 127 (see Fig. 14) and a smaller longer bore at the lower end constituting a primary lift cylinder 128. A piston device 129 is reciprocally mounted in the cylinder 127 and is formed with a reduced depending flange 130 adapted to engage a piston 131 reciprocable in cylinder 128 and secured to a piston rod 132 carrying at its lower end a movable frame 133.

Figures 5, 5A:
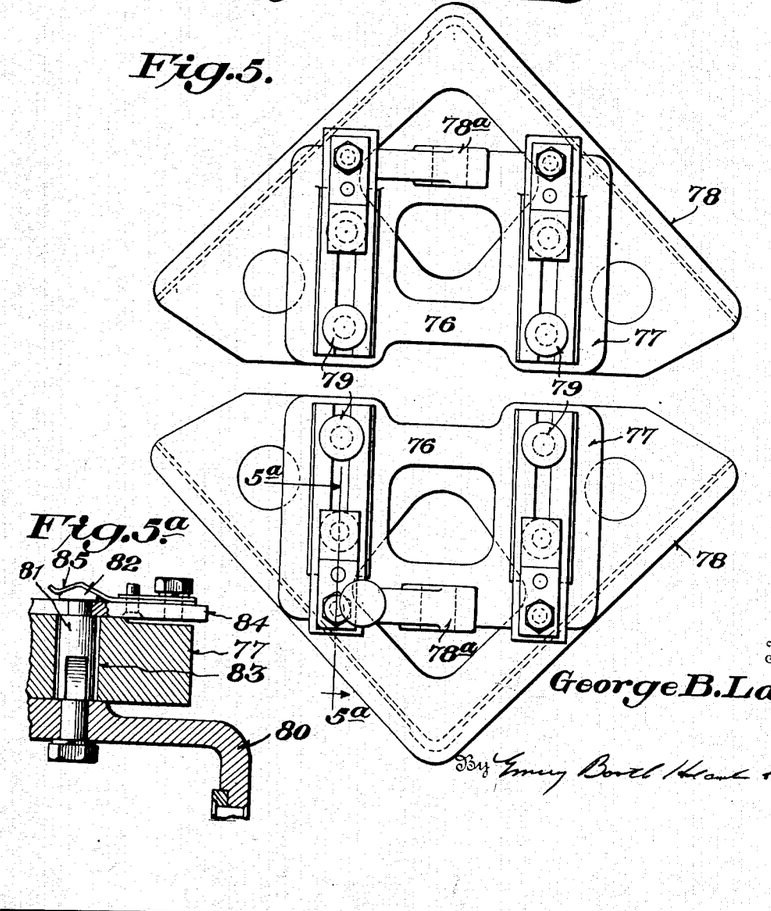
Fig. 5 is a horizontal sectional view taken on the line 5—5 of Fig. 3.
Fig. 5a is a detail section on the line 5a—5a of Fig. 5.

Connected to the movable frame and immediately below it is a horizontally disposed double cylinder 134 in which is mounted a pair of opposed pistons 135, the rods 136 of which extend outwardly beyond the cylinder ends and carry ware-gripping tong holders 137. As will be apparent, the construction of the double cylinder 134, piston 135, tong holders 137 and ware-gripping tongs 138 may be of the same construction described above and illustrated in Figs. 3, 5 and 5ª.

The admission of air under pressure to actuate the pistons 129 and 131 to their elevated and lowered positions is advantageously controlled by a suitable valve herein illustrated as of the spool type, comprising a casing 141 and spool valve 142 adapted to be reciprocated in the casing 141 by air pressure applied alternately at opposite ends to establish air pressure from the constant pressure line M alternately to lines 143—144 leading respectively to the lower ends of the primary and secondary lift cylinders 128, 127.

The carriage 123 is normally positioned over a mold positioned at the takeout station of the forming machine, as a mold is moved to the takeout station. In this normal position the ware-gripping tong holders are open and in the secondary or high lift position as shown in Fig. 16, by reason of air pressure supplied to cylinder 128 below piston 131 through line 143 valve 146 being on exhaust. The valve 146 is normally positioned by a spring to establish flow of air from air line M to line 144 and cylinder 127, but when the ware-gripping tongs are open this valve 146 may be pneumatically moved to exhaust air from cylinder 127 and line 145 as will be later described.

As the mold 4 is stopped at the takeout station, air admitted to line A from any suitable control valve (not shown) actuates the mold opening piston 7 in cylinder 8 to open the mold. As a result of the mold opening movement, the finger cam 62 on mold opening piston rod momentarily lifts stem 61 of valve 60 admitting a flash of air from line A' to line A² leading to the right hand end of valve casing 141 (Fig. 16) to shift spool valve 142 to the left. The action of finger cam 62 is such that it merely holds valve stem 61 open on its mold opening stroke only, for a sufficiently long dwell to operate valve 142. On its return stroke cam 62 does not lift main stem 61. Shifting of spool valve 142 to the left establishes air flow from constant air line M to line 144 leading to the upper end of primary lift cylinder 128, to lower the piston 131, piston rod 132 and ware-gripper frame 133. During this lowering of the ware-gripper frame, the piston 129 is held in its raised position in the secondary lift cylinder 127.

The lowering of the piston 131 as above described, continues to position the ware-gripping tongs 138 below the upper edge of the opened mold and around the ware. When the tongs 138 have reached their proper lowered position, the stem 148 of a poppet valve 149 strikes an adjustable stop member 150 (see Figs. 12, 13 and 16) to admit air pressure from constant air line M to left hand end of a grasping cylinder operating valve 151 to shift the valve stem 152 thereof to the right (Fig. 16), thus establishing air pressure flow from constant air line M to line 154 connected to port 155 of the double cylinder 134, to move the pistons 135 toward each other and cause the grasping jaws 138 to grip the ware in the mold. As the jaw members 138 move inwardly, an adjustable cam button 156 on one of the holders 137 (see Figs. 14 and 16), lifts the stem 157 of poppet valve 158 to admit air from line 154 to line 159 leading to the left hand end of valve 141 (Fig. 16) to shift the valve stem 142 to the right and establish air flow from line M to line 143 leading to the lower end of primary lift cylinder 128 and lift the grasping tongs 138 and ware gripped thereby vertically to a level above the plane of the top of the mold.

As the grasping jaws are moved to closed position, as above described, the piston 129 is lowered in the secondary lift cylinder 127 by air supplied from line 145 (Fig. 16) controlled by valve 146 (Figs. 16 and 17). This valve has a casing supplied with constant air M and an outlet communicating with line 145. The valve stem 146ª is normally positioned by a spring 146ᵇ to supply main air through line 143 to the upper end of cylinder 127 and hold piston 129 in its lowered position in the secondary lift cylinder.

During the vertical movement of the tongs and ware to lift the ware above the mold, the piston 129 is held in its lowered position in the secondary lift cylinder, since the upper face area of piston 129 is larger than the area of piston 131, thus limiting movement of piston, during this operation, to its primary lift cylinder.

When the tongs 138 and gripped ware have reached the primary elevated position, they are ready to be shifted laterally away from the mold. A roller cam member 160 on the frame 133 (Figs. 14 and 16) engages stem 161 of a horizontal cylinder trip valve 162 to admit air from line 154 to line 163 leading to the left hand end of horizontal cylinder operating valve 66 to shift the valve stem therein to the right and establish air flow from constant pressure line M to the inner end of cylinder 26 to cause the outward travel of the carriage 123 and associated ware-gripping tongs and ware to a position over a conveyor or other suitable support.

At the end of such outward travel, the stem 164 of a poppet valve 165 (Fig. 16) strikes an adjustable stop member 166 to admit air from line M through port 167 to shift valve 152 to the left (as viewed in Fig. 16), and establish air flow from line M to line 167 leading to the center of double cylinder 134 to move the piston therein outwardly to release the ware. During this outward movement an adjustable cam button 168 on one of the holders 137 strikes stem 169 of poppet valve 170 to admit air from line 167 to line 171 leading to the top of valve 147 and move the valve therein against the tension of its spring to place line 145 and the upper end of secondary lift cylinder 127 on exhaust.

At this time pressure air is still maintained in line 143 because valve stem 142 of valve 141 has not been shifted and hence exhausting the air above piston 129 permits air in line 143 to move pistons 131 and 129 to their uppermost positions, preparatory to the return of the carriage 123 to its position over the mold carrier. Thus, after the ware is released from the tongs, the tongs are elevated so that the ware may move out from under them.

The return movement of the carriage 123 to its normal position over the mold carrier is obviously effected by the inward movement of the piston 24 in its cylinder. To effect this operation the horizontal cylinder operating valve 66 must be reversed, i. e. shifted to the left as viewed in Fig. 16. This advantageously may be accomplished by admitting air under pressure to line 175 connected to the table lock pin control valve which is arranged to admit air to line 175 simultaneously with the withdrawal of the table lock pin 71 from engagement with the mold table 3, preparatory to the next indexing movement of the mold carriers. A branch line 175a leads to the center of a table rotating safety valve 176, which has previously been shifted during the outward horizontal movement of the carriage by line 177 supplied by air from horizontal cylinder operating valve 66 so as to establish air flow communication between branch line 175a and line 178 to raise pull-down cylinder piston and permit pin 12 to be seated in the socket 13. Hence, indexing of the mold carrier is only possible providing the takeout carriage has previously been moved outwardly and the valve 176 has previously been set in its operative position. The return travel of the carriage 123 may, advantageously, take place during the succeeding indexing movement of the mold table 3, and as will be apparent, the horizontal movement of the frame 133 and tongs 138 in a plane above the plane of the outward horizontal travel, because the secondary lift piston 129 is elevated in its cylinder 127.

A manually operated control valve 100 similar to the valve 100 above described may be interposed in air lines A² and 175a to render the takeout mechanism inoperative while permitting continued indexing of the forming machine table.

The invention illustrated and described herein is highly advantageous in removing glassware from openable molds wherein the grasping tongs must be lowered to a plane below the plane of the tops of the molds, although it is obvious that the invention is not limited in its use to such arrangements, but may be used with solid molds. Furthermore, the improved takeout mechanism permits the removal of large size ware from molds which need only be opened slightly less than the diameter of the ware. Likewise, the invention is not to be limited to takeout mechanism wherein the gripping tongs are moved inwardly to grip the outside walls of the ware, as obviously the particular form of the ware-gripping members may be modified so that they may be expanded to grip the inner side walls of the ware.

Having described two illustrative embodiments of the invention, I claim as new:

1. In combination with a glassware forming machine having a movable mold carrier, a plurality of sectional openable molds thereon, means for moving said carrier to present said molds successively to a takeout position, and means for opening the molds at said takeout position, of a takeout mechanism comprising ware-grasping tongs normally positioned over said mold at the takeout position, means controlled by and operative following the opening movement of said molds for first lowering said tongs to a plane below the top of the mold, means for then moving said tongs laterally to engage and grip the ware, means for lifting said tongs and ware to a plane above the top of the mold, means for shifting said tongs laterally to a point remote from said mold, means for releasing said tongs from the ware and means for returning said tongs to their normal position at the takeout position of the forming machine.

2. A glassware forming machine as defined in claim 1 wherein all of the means for operating the takeout mechanism and ware-grasping jaws are penumatically operated.

3. In combination, a glassware forming machine having a movable mold carrier, means for intermittently moving said carrier to present successively said molds to a takeout position, means for opening said molds, a takeout mechanism comprising a travelling carriage, ware-grasping jaws on said carriage, mechanisms movable with said carriage for moving said grasping jaws horizontally to engage and release the ware and to raise and lower the jaws, means mounted independently of the carriage for moving said carriage in opposite directions between the takeout position of the forming machine and a point laterally remote therefrom, means controlled by and operative following the opening movement of the mold for actuating said takeout succesively to lower the jaws below the upper plane of the mold, move the jaws into engagement with the ware, shift the jaws and ware upwardly and laterally and then release the ware, means controlled by the operation of the mold carrier moving means for returning the grasping tongs to their initial position at the takeout position, and means for preventing the succeeding indexing movement of the mold carrier prior to the return of the takeout mechanism toward the normal position at the takeout position of the forming machine.

4. A takeout mechanism for glassware forming machines comprising a horizontally travelling carriage, means for moving said carriage horizontally, a pneumatically actuated raising and lowering mechanism mounted on said carriage, a frame movable thereby, a double air cylinder mounted on the frame, a pair of opposed pistons working in said cylinder, and ware gripping members connected to said pistons, and valve means on said carriage for admitting air under pressure alternately to the center and to the opposite ends of said double air cylinder to move the ware-gripping members away from and toward the ware.

5. A takeout mechanism for glassware forming machines comprising a horizontally travelling carriage, means for moving said carriage horizontally, a pneumatically actuated raising and lowering mechanism mounted on said carriage, a frame movable thereby, a double air cylinder mounted on the frame, a pair of opposed pistons working in said cylinder, ware-gripping jaws connected to said pistons, adjustable means carried by said ware-gripping jaws for engagement with said cylinder for adjusting the closing movement of said jaws.

6. A takeout mechanism for glassware forming machines comprising a horizontally movable carriage, means for moving the carriage horizontally, a pneumatically actuated raising and lowering mechanism mounted on said carriage, a frame movable thereby, a double air cylinder mounted on the frame, a pair of opposed pistons working in said cylinder, valve means on said carriage for admitting air under pressure alternatively to the center and to the opposite ends of said double air cylinder to move the pistons away from and toward each other, and a ware-gripping member connected with each piston, said ware-gripping member including a generally triangular horizontally disposed body portion connected to said piston and depending flanges extending from two outer side edges of the body portion for engagement with two walls of the ware.

7. A takeout mechanism for glassware forming machines comprising a horizontally travelling carriage, a frame carried thereby, a pair of horizontally movable holders movably mounted on said frame and movable towards and from each other, a ware-gripping member removably mounted on each holder, said ware-gripping members being provided with pins extending through openings in said holders, and latch means engaging said pins for securing said ware-gripping members to said holders and means for adjusting the extent of movement of said holders and gripping members towards each other.

8. In combination with a glassware forming machine having a movable mold carrier, means for moving said carrier, of a takeout mechanism comprising a horizontally travelling carriage, ware-gripping members on said carriage, an air cylinder and piston mechanism for raising and lowering said ware-gripping members, a valve controlling the supply of air to opposite ends of said cylinder, a cylinder and piston mechanism for moving said carriage laterally to and from a position over the mold carrier, pneumatically operated means including fluid pressure conduits for admitting air to the opposite ends of said last-named cylinder, a cut-off valve in said conduits, and means controlled by said first named valve for maintaining said cut-off valve closed when said first named valve is positioned to lower the gripping members.

9. In combination with a glassware forming machine having a movable mold carrier, means for moving said carrier, of a takeout mechanism comprising a horizontally travelling carriage, ware-gripping members on said carriage, an air cylinder and piston mechanism for raising and lowering said ware-gripping members, a valve controlling the supply of air to opposite ends of said cylinder, a cylinder and piston mechanism for moving said carriage laterally to and from a position over the mold carrier, pneumatically operated means including fluid pressure conduits for admitting air to the opposite ends of said last named cylinder, a cut-off valve in said conduits, and means controlled by said first named valve for maintaining said cut-off valve closed when said first named valve is positioned to lower the gripping members, and additional means for maintaining said cut-off valve closed when the ware-gripping members are lowered.

10. In combination, a glassware forming machine having a movable mold carrier, means for moving said carrier, means for intermittently connecting said mold moving means to said carrier, means for locking said carrier against movement when said connecting means is disconnected from said carrier, a takeout mechanism including a horizontally travelling carriage, ware-gripping members on said carriage, means for raising and lowering said ware-gripping members, means for moving said carriage laterally, a safety device movable to prevent operation of the machine when said ware-gripping members are lowered, said safety device controlling operation of the connecting means to prevent connection between the mold carrier and carrier-moving means when the ware-gripping members are in a lowered position.

11. In combination, a glassware forming machine having a movable mold carrier, means for moving said carrier to present the molds successively to a takeout position, a takeout mechanism comprising a horizontally travelling carriage, ware-gripping members thereon, means on said carriage for raising and lowering said gripping members to lowered, elevated and intermediate positions, means normally positioning said carriage over a mold at the takeout position with the ware-gripping members at the intermediate elevation, pneumatic control means controlled by and set in operation by a movable part of said forming machine for controlling the lowering of said ware-gripping members, means for moving said ware-gripping members toward each other to engage and grip the ware, means for raising the ware above the plane of the top of the mold, means for shifting the carriage and ware laterally, means for releasing the ware, means for raising the ware-gripping members to their elevated position and means for returning the carriage to the takeout position.

12. A takeout mechanism for glassware forming machines comprising a horizontally travelling carriage, means for moving said carriage laterally to and from takeout and ware-depositing positions, ware-gripping members movably mounted on said carriage, means for moving said ware-gripping members in a horizontal plane and in opposite directions to engage and release the ware, means movable with said carriage for raising and lowering said ware-gripping members, and valve means on the carriage controlled by and operated upon the completion of the lowering of the gripping members for actuating the ware-gripping moving means to cause the gripping members to engage the ware and valve means controlled by and operated upon the gripping of the ware for actuating the raising means to lift the gripping members and ware.

13. A takeout mechanism for glassware forming machines comprising a horizontally travelling carriage, means for moving said carriage laterally to and from takeout and ware-depositing positions, ware-gripping members movably mounted on said carriage, pneumatically operated means for moving said gripping members in a horizontal plane and in opposite directions to engage and release the ware, a pneumatically operated mechanism including a cylinder and piston device mounted on said carriage for raising and lowering said ware-gripping members, a valve mounted on said carriage for controlling the opposed horizontal movements of ware-gripping members, a valve for controlling the admission of air under pressure to opposite ends of said cylinder, and to said first named valve, and means for insuring a supply of air to said first named valve during opposed positions of the raising and lowering piston in its cylinder.

14. A takeout mechanism for glassware forming machines comprising a horizontally travelling carriage, means for moving said carriage laterally to and from takeout and ware-depositing positions, ware-gripping members movably mounted on said carriage, pneumatically operated means for moving said gripping members in a horizontal plane and in opposite directions to engage and release the ware, a pneumatically operated mechanism including a cylinder and piston device mounted on said carriage for raising and lowering said ware-gripping members, a valve mounted on said carriage for controlling the opposed horizontal movements of ware-gripping members, a reciprocable valve for controlling the admission of air under pressure to opposite ends of said cylinder and to said first named valve, and means for insuring a supply of air to said first named valve during opposed positions of the reciprocable valve.

15. A takeout mechanism for glassware forming machines comprising a horizontally travelling carriage, means for moving said carriage laterally to and from takeout and ware-depositing positions, ware-gripping members movably mounted on said carriage, pneumatically operated means for moving said gripping members in a horizontal plane and in opposite directions to engage and release the ware, a valve controlling the admission of air to said pneumatically operated means, a cylinder and piston mechanism on said carriage for raising and lowering said ware-gripping members, passages arranged to supply air under pressure alternately to the top and bottom of said cylinder, and means establishing pressure air communication between each of said passages and said valve.

16. A takeout mechanism for glassware forming machines comprising a horizontally travelling carriage, means for moving said carriage laterally to and from takeout and ware-depositing positions, ware-gripping members movably mounted on said carriage, pneumatically operated means for moving said gripping members in a horizontal plane and in opposite directions to engage and release the ware, a valve controlling the admission of air to said pneumatically operated means, a cylinder and piston mechanism on said carriage for raising and lowering said ware-gripping members, passages arranged to connect the top and bottom of said cylinder alternately with air under pressure and exhaust, and means to establish air pressure communication only between each of said passages and said valve.

17. A takeout mechanism for glassware forming machines comprising a travelling carriage, means for moving said carriage laterally to and from takeout and ware-depositing positions, ware-gripping members movably mounted on said carriage, means for moving said ware-gripping members in opposite directions to engage and release the ware, elevating means on said carriage for moving said gripping members and maintaining them at different elevated positions and means for controlling said elevating means to lift and maintain the ware at one elevation during travel from the takeout position to ware-depositing position, and means to thereafter move the elevating means to a higher level to maintain the gripping members at said higher level during travel from the ware-depositing position to the takeout position.

18. A takeout mechanism for glassware forming machines comprising a travelling carriage, means for moving said carriage laterally to and from takeout and ware-depositing positions, ware-gripping members movably mounted on said carriage, means for moving said ware-gripping members in opposite directions to engage and release the ware, means including primary and secondary lift cylinders for maintaining said ware-gripping members at different elevations whereby the ware-gripping members are caused to be moved in one horizontal direction at a level above that at which said members are moved in the opposite direction.

19. A takeout mechanism for glassware forming machines having a mold comprising a travelling carriage, means for moving the carriage laterally to and from takeout and ware-depositing positions, ware-grasping members movably mounted on said carriage, means for moving said ware-grasping members toward each other to engage the ware, means to elevate the ware grasping members and ware above the mold, means to move the grasping members vertically to then move the grasping members and ware laterally to ware-depositing position, means to open the grasping members to release the ware prior to vertical movement of the grasping members at the ware-depositing position, means to then elevate the open grasping members above the released ware, and means for returning the carriage to the takeout position.

20. A takeout mechanism for glassware forming machines as defined in claim 19 in which the ware-grasping members embrace a substantial portion of the upper edge and side walls of the ware.

21. A takeout mechanism for glassware forming machines having a mold, comprising a travelling carriage, means for moving the carriage laterally to and from takeout and ware-depositing positions, ware-grasping members movably mounted on said carriage, means for moving said ware grasping members toward each other to engage the ware, primary and secondary lift cylinders for effecting vertical movement of the ware-grasping members, means for operating the primary lift cylinder to elevate the grasping members and ware above the plane of the top of the mold, means to then move the grasping members and ware laterally to ware-depositing position, means to open the grasping members to release the ware, means to then operate the secondary lift cylinder to elevate the open grasping members above the released ware, and means for returning the carriage to its takeout position.

22. A takeout mechanism for glassware forming machines having a mold, comprising a horizontally travelling carriage, ware-grasping members movably mounted on said carriage, elevating means mounted on said carriage for initially raising the grasping members above the mold and subsequently raising the grasping members above the released ware, said elevating means comprising a cylinder, a piston movable in said cylinder and connected to said grasping members, a supplemental piston in said cylinder, and means for maintaining said supplemental piston in its lowered position during the initial elevation of said grasping member.

23. A takeout mechanism for glassware forming machines having a mold, comprising a horizontally travelling carriage, ware-grasping members movably mounted on said carriage, elevating means mounted on said carriage for initially raising the grasping members above the mold and subsequently raising the grasping members above the released ware, said elevating means comprising a cylinder, a piston movable in said cylinder and connected to said grasping members, a supplemental piston in said cylinder, and means for maintaining said supplemental piston in its lowered position during the initial elevation of said grasping member, and means for rendering said last named means inoperative upon the opening of the ware-grasping members.

24. A takeout mechanism for glassware forming machines having a mold, comprising a horizontally travelling carriage, ware-grasping members movably mounted on said carriage, elevating means mounted on said carriage for initially raising the grasping members above the mold and subsequently raising the grasping members above the released ware, said elevating means comprising a cylinder, a piston movable in said cylinder and connected to said grasping members, a supplemental piston mounted in the upper portion of said cylinder and mounted for limited vertical movement therein, and means for maintaining said supplemental piston in its lowered position during the initial elevation of said grasping member.

25. A takeout mechanism for glassware forming machines having a mold, comprising a horizontally travelling carriage, ware-grasping members movably mounted on said carriage, elevating means mounted on said carriage for initially raising the grasping members above the mold and subsequently raising the grasping members above the released ware, said elevating means comprising a cylinder, a piston movable in said cylinder and connected to said grasping members, a supplemental piston in said cylinder, and a normally open spring pressed valve controlling a supply of air under pressure upon the upper face of said supplemental piston for maintaining said piston in its lowered position during the initial elevation of said grasping member.

26. A takeout mechanism for glassware forming machines having a mold, comprising a horizontally travelling carriage, ware-grasping members movably mounted on said carriage, elevating means mounted on said carriage for initially raising the grasping members above the mold and subsequently raising the grasping members above the released ware, said elevating means comprising a cylinder, a piston movable in said cylinder and connected to said grasping members, a supplemental piston in said cylinder, a spring pressed normally open valve for admitting air pressure to the upper end of the supplemental piston during the initial elevation of the grasping members, and means controlled by the opening movement of the grasping members for pneumatically actuating said valve to exhaust air from above said supplemental piston.

GEORGE B. LANGER.